United States Patent [19]
Huang et al.

[11] Patent Number: 5,922,459
[45] Date of Patent: Jul. 13, 1999

[54] PLASMA-POLYMERIZED DMDAS ANTI-FOGGING FILM AND METHOD FOR MANUFACTURING THE SAME

[75] Inventors: Dao-Yang Huang, Hsinchu; Chao-Tsang Wei, Taipei, both of Taiwan

[73] Assignee: Industrial Technology Research Institute, Hsinchu, Taiwan

[21] Appl. No.: 08/956,403

[22] Filed: Oct. 23, 1997

[51] Int. Cl.$^6$ ....................................................... B32B 7/12
[52] U.S. Cl. ........................ 428/349; 428/447; 428/355; 428/339; 427/489; 427/491; 427/534; 427/539; 524/265; 524/266; 524/262; 524/157; 528/31; 528/43
[58] Field of Search .................................... 427/539, 536, 427/535, 534, 491, 489; 428/447, 336, 349, 355, 339, 448; 524/265, 266, 157, 262; 426/127, 393, 129, 410, 412, 415, 419, 106; 528/31, 43

[56] References Cited

U.S. PATENT DOCUMENTS

| | | | |
|---|---|---|---|
| 3,392,133 | 7/1968 | Stickelmeyer et al. | 260/29.6 |
| 4,463,114 | 7/1984 | Balchunis et al. | 524/157 |
| 4,532,185 | 7/1985 | Balchunis et al. | 428/447 |
| 5,427,807 | 6/1995 | Chum et al. | 426/393 |
| 5,451,460 | 9/1995 | Lu et al. | 428/349 |
| 5,487,920 | 1/1996 | Lopata et al. | 427/489 |

*Primary Examiner*—Merrick Dixon
*Attorney, Agent, or Firm*—W. Wayne Liauh

[57] ABSTRACT

A plasma-polymerized anti-fogging film is formed by polymerization-depositing a high molecular polymerized DMDAS film on a substrate to provide the substrate surface with anti-fogging capability. The plasma polymerization deposition process is performed by using diacetoxy silane monomer that contains bi-carboxylate O═C—O— functional group as the reactant monomer with an introduction of a suitable amount of oxygen to cause the polymerization reaction. The reactant monomer and the oxygen are introduced into a vacuum deposition apparatus and a high energy plasma is generated between electrodes of the vacuum deposition apparatus to cause the polymerization reaction on the substrate to form thereon the high molecular polymerized DMDAS anti-fogging film.

9 Claims, No Drawings

PLASMA-POLYMERIZED DMDAS ANTI-FOGGING FILM AND METHOD FOR MANUFACTURING THE SAME

FIELD OF THE INVENTION

The present invention relates generally to an anti-fogging film and a method for manufacturing the anti-fogging film, and move particularly to the formation of forming a plasma-polymerized dimethyl diacetoxy silane (DMDAS) film on a plastic or glass substrate.

BACKGROUND OF THE INVENTION

Plastics and glass are widely used in making optical elements, such as window panes, mirrors, spectacle lenses and goggles. During general use of these optical elements, due to changes in temperature and/or humidity of the surroundings, dewing may occur on the surfaces of the plastic or glass optical elements. This deteriorates the degree of transparency and thus, the visual performance provided by the glass or plastic optical elements.

To overcome such a problem, an anti-fogging film is generally coated on the surface of the optical elements on which dewing is expected to happen. Such an anti-fogging film and related techniques have been disclosed and discussed in a number of U.S. patents and one of the conventional ways used to form the anti-fogging film is to coat a polymer layer containing —C—OH functional group by means of immersion into a solution containing the high molecular compounds. Examples of such a technique include U.S. Pat. Nos. 4,242,412, 4,332,859 and 5,075,133.

There are also techniques of coating a compound film containing an ionic surface active agent of long chain molecules that contains —$SO_3$ functional group and an inorganic salt by means of immersion, such as U.S. Pat. No. 4,214,908 which discloses a compound film containing an ionic surface active agent of long chain molecule that contains —$SO_3$ functional group and an inorganic salt. The compound film is also formed by means of immersion technique.

Further, U.S. Pat. Nos. 4,778,909 and 5,134,021 disclose a technique of immersion into a coating forming solution(s) to form a single-layered or multiple-layered compound film containing polyvinyl alcohol, micro-particles of silica gel and organic silicon. The film so prepared generates —Si—OH functional groups in hydrolysis which possesses an excellent anti-fogging capability.

A significantly different technique is disclosed in U.S. Pat. No. 5,316,825 in which a single layer of specifically shaped micro-porous synthetic resin is provided for anti-fogging purpose.

Recently, Balzers Co., Swiss, develops a plasma polymerization technique for forming high molecular anti-fogging film containing —C=O or —C—OH functional group on optical lenses. The technique uses polyvinyl acetate monomer and oxygen as the reactants in forming the film. The detail of the technique may be obtained in *Optical Engineering*, September 1995, Vol. 34, page 2717.

The conventional ways of forming the anti-fogging film by immersion have the disadvantage of disposal of the immersion solution which may cause environmental problems. Further, the durability and stability of the antifogging films formed by means of previously discussed prior art techniques are far from ideal. As to the Balzers' technique, the film so obtained from the polyvinyl acetate monomer has problems in both hardness and adhesion.

It is thus desired to have a highly effective anti-fogging film having a simple structure but retaining the anti-fogging capability for a longer term.

SUMMARY OF THE INVENTION

Thus, the principal object of the present invention is to provide a highly effective, single-layered anti-fogging film which has a simple structure but will retain the anti-fogging capability for a long time, the single-layered film being applicable for regular glass or plastic lenses, particularly swimming goggles or diving masks.

Another object of the present invention is to provide a method of forming an anti-fogging film, wherein a vacuum plasma polymerization deposition technique is used to replace the conventional immersion technique in forming the anti-fogging film so that no environmental problems, which were often caused by the disposed immersion solution needed in the conventional immersion technique, may happen.

A further object of the present invention is to provide an improved anti-fogging film which comprises a transparent film formed by a single layer of plasma-polymerized DMDAS coating containing polar bi-carboxylate O=C—O— functional group so as to provide a more durable and more stable anti-fogging capability. The high molecular weight polymerization film formed in accordance with the present invention is essentially based on a three dimensional-Si—O—Si— bonding, rather than the organic —C—C— bonding so that the film obtained has an improved hardness and adhesion. Such a film may also serves as a hard coating for plastic lenses.

The present invention will be further explained with reference to the following description of a preferred embodiment and several examples thereof.

DETAILED DESCRIPTION OF THE PREFERRED EMBODIMENT

The present invention makes use of plasma polymerization technique on a substrate, such as optical lens, to form a single-layered high molecular weight polymerized transparent anti-fogging film containing polymerized DMDAS or diacetoxy silane that, similar to DMDAS, contains bi-carboxylate O=C—O— functional group for providing the surface of the substrate with an anti-fogging capability. Diacetoxy silane compounds include diacetoxy silane (DAS), methyl diacetoxy silane (MDAS), and dimethyl diacetoxy silane (DMDAS).

The formation of the anti-fogging film is perfermed with a parallel plate electrode type vacuum deposition coater to which a 50 KHz alternating current is applied to generate a plasma between the parallel electrodes. The plasma polymerization technique is used to carry out deposition of a layer of high molecular DMDAS film having a thickness about between 30–300 nm on the substrate. A preferable range of the film thickness is between 50–100 nm and the most preferable thickness is 50 nm. The substrate on which the polymerization reaction occurs comprises glass, PC, PMMA, CR39 lenses or plastic swimming goggles.

The reactant monomer for forming the anti-fogging film in the polymerization reaction is diacetoxy silane monomer that contains bicarboxylate O=C—O— functional groups with an introduction of a suitable amount of oxygen in deposition to provide the desired reaction. Once the reactant monomer and oxygen are introduced into the vacuum deposition apparatus, they are activated by the high energy plasma generated between the parallel plate electrodes to cause the polymerization reaction on the surface of the substrate so as to form the high molecular polymerized DMDAS anti-fogging film.

Since each of the DMDAS molecules has two polar carboxylate O=C—C— functional groups, the polymerized film so formed contains throughout the surface and interior thereof hydrophilic functional groups. These uniformly distributed hydrophilic functional groups on the surface and in the interior of the film are ready to absorb and retain water molecules and the water molecules that are absorbed thereby have an affinity to external water molecules so that even in a highly humid environment the substrate may be kept wet without fogging.

Since the DMDAS transparent anti-fogging film of the present invention comprises polar carboxylate O=C—O— functional group, which is more stable than the Si—OH functional group, to absorb moisture and thus keep the lens surface wet so as to provide a more durable and more stable anti-fogging capability.

Further, the high molecular weight polymerized DMDAS anti-fogging film in accordance with the present invention is using -Si—O—Si— bonding to accomplish the polymerization so that the film formed has a good hardness which is particularly useful for plastic lens as it may serve as a hard layer of the plastic lens.

The manufacturing process of the anti-fogging film in accordance with the present invention will be now described by means of two examples:

EXAMPLE 1

The first example of the present invention uses a piece of glass as the substrate which is first cleaned by using alcohol to wipe the surface thereof. The substrate is then dried with compressed air and then placed into a processing chamber of the parallel plate electrode type vacuum deposition apparatus. The processing chamber is evacuated to a vacuum of approximately $2 \times 10^{-5}$ Torr. A reactant monomer of 5 sccm and oxygen of 10 sccm are then introduced into the processing chamber and, at the same time, the interior pressure of the processing chamber is maintained at approximately $1 \times 10^{-2}$ Torr. An alternating current having a frequency of 50 KHz and an output power of 200 W is applied to the plate electrodes of the vacuum deposition apparatus to generate a plasma therebetween which causes the deposition of DMDAS on the substrate surface at a deposition rate of 0.5 nm/sec to form a DMDAS anti-fogging film of 50 nm thickness.

The DMDAS anti-fogging film so obtained is tested with 3M® adhesive tape and no peeling occurs. This shows the superior adhesion of the anti-fogging film of the present invention on the glass substrate. A further test for anti-fogging capability of the film on the glass substrate is carried out as follows:

(I) Positioning the glass substrate having the DMDAS coating thereon at a distance of 5 cm above hot water of 95° C. for approximately one (1) minute.

(II) Visually inspecting the fogging phenomenon or formation and distribution of water droplets on the glass substrate.

(III) Removing the glass away from the hot water and exposing it to the atmosphere for at least 15 minutes.

(IV) Repeating steps (I) to (III) until the anti-fogging capability of the film vanishes.

The result of the above anti-fogging test shows that the DMDAS film in accordance with present invention may still be effective in preventing the formation of fog on the substrate surface for at least 50 test cycles.

EXAMPLE 2

The substrate of this test is a polycarbonate (PC) swimming goggle lens which is first cleaned by using alcohol to wipe the surface thereof and then dried with compressed air. The lens is then positioned into the processing chamber of the parallel plate electrode type vacuum deposition apparatus and the processing chamber is evacuated to approximately $2 \times 10^{-5}$ Torr. A reactant monomer of 5 sccm and oxygen of 10 sccm are introduced into the chamber to maintain the chamber pressure at approximately $1 \times 10^{-2}$ Torr. An alternating current having a frequency of 50 KHz and an output power of 200 W is applied to the plate electrodes of the vacuum deposition apparatus to generate a plasma therebetween which causes deposition of DMDAS on the substrate surface at a deposition rate of 0.5 nm/sec to form a DMDAS anti-fogging film of 50 nm thickness.

The DMDAS anti-fogging film so obtained is tested with 3M® adhesive tape and no peeling occurs. This shows the superior adhesion of the anti-fogging film of the present invention on the PC substrate. A further test for anti-fogging capability of the film on the PC substrate is carried out as follows:

(I) Positioning the PC lens having the DMDAS coating thereon at a distance of 5 cm above hot water of 95° C. for approximately one (1) minute.

(II) Visually inspecting the fogging phenomenon or formation and distribution of water droplets on the PC lens.

(III) Removing the PC lens away from the hot water and exposing it to the atmosphere for at least 15 minutes.

(IV) Repeating steps (I) to (III) until the anti-fogging capability of the PC lens vanishes.

The result of the above anti-fogging test shows that the DMDAS film in accordance with present invention may still be effective in preventing the formation of fog on the substrate surface for at least 50 test cycles.

The test results of the above tests commonly show that the plasma-polymerized DMDAS anti-fogging film in accordance with the present invention maintains its anti-fogging capability after 50 test cycles without significant deterioration. Further, the DMDAS film retains an excellent moisture absorption and hydrophilic characteristics during and throughout the test cycles.

EFFECTIVENESS OF THE INVENTION

As compared with the conventional immersion technique used to form the conventional anti-fogging film, the present invention provides at least the following advantages:

(1) there is no environment pollution problem caused by the immersion solution and thus the potential pollution is reduced.

(2) the plasma-polymerized DMDAS transparent anti-fogging film uses polar bi-carboxylate O=C—O— functional group which is more durable than the conventionally used —Si—OH functional group to absorb moisture, which may keep the lens surface wet to provide a more durable and more stable anti-fogging effectiveness.

(3) the DMDAS monomer used in the present invention is advantageous as compared to the reactant of the Balzers Co., polyvinyl acetate monomer, in that the high molecular polymerized film of the present invention is based on cross-linking -Si—O—Si— bonding, rather than organic —C—C— bonding so as to have greater hardness and better adhesion. This is particularly useful for plastic lenses for the film may serve as a hard surface layer.

Although examples of the present invention are given to demonstrate the present invention, yet it is possible for those having ordinary skilled in the art to make certain variation, modification and substitution without departing from the scope of the present invention which is only defined by the appended claims as follows.

What is claimed is:

1. A plasma-polymerized anti-fogging film formed on a surface of a substrate to provide an anti-fogging capability, said anti-fogging film comprising polymerized dimethyl diacetoxy silane (DMDAS) monomers formed on a surface of a substrate, wherein said dimethyl diacetoxy silane monomers containing at least one bi-carboxylate O=C—O— functional group.

2. The plasma-polymerized anti-fogging film as claimed in claim 1, wherein the film has a thickness ranging between 30–300 nm.

3. The plasma-polymerized anti-fogging film as claimed in claim 2, wherein the thickness of the film is between 50–100 nm.

4. The plasma-polymerized anti-fogging film as claimed in claim 1, wherein the high molecular polymerized transparent anti-fogging film is diacetoxy silane.

5. The plasma-polymerized anti-fogging film as claimed in claim 1, wherein the film is methyldiacetoxy silane.

6. The plasma-polymerized anti-fogging film as claimed in claim 5, wherein the film has a thickness ranging between 50–100 nm.

7. A plasma-polymerized anti-fogging film as claimed in claim 1 wherein said anti-fogging film is formed on said substrate using a process comprising the steps of:

(a) positioning said substrate into a vacuum deposition apparatus containing a pair of parallel plate electrodes;

(b) introducing a dimethyl diacetoxy silane (DMDAS) reactant monomer and oxygen into the vacuum deposition apparatus; and (c) applying an alternating current to said parallel plate electrodes of said vacuum deposition apparatus to activate said reactant monomer and said oxygen and cause a high energy plasma to be generated therefrom, and subsequently a polymerization reaction of said reactant monomer on a surface of said substrate to form a polymerized DMDAS film on said substrate.

8. A process for forming an anti-fogging film on a substrate, comprising the steps of;

(a) positioning a substrate into a vacuum deposition apparatus containing a pair of parallel plate electrodes;

(b) introducing a dimethyl diacetoxy silane (DMDAS) reactant monomer and oxygen into the vacuum deposition apparatus; and (c) applying an alternating current to said parallel plate electrodes of said vacuum deposition apparatus to activate said reactant monomer and said oxygen and cause a high energy plasma to be generated therefrom, and subsequently a polymerization reaction of said reactant monomer on a surface of said substrate to form a polymerized DMDAS film on said substrate.

9. The process for forming an anti-fogging film on a substrate as claimed in claim 8, wherein the reactant monomer comprises diacetoxy silane monomer that has bi-carboxylate O=C—O— functional group.

* * * * *